Jan. 4, 1955  J. M. VERNHES  2,698,679
ELECTROMAGNETIC CLUTCH WITH TWO ACTIVE FACES
Filed April 24, 1951  3 Sheets—Sheet 1
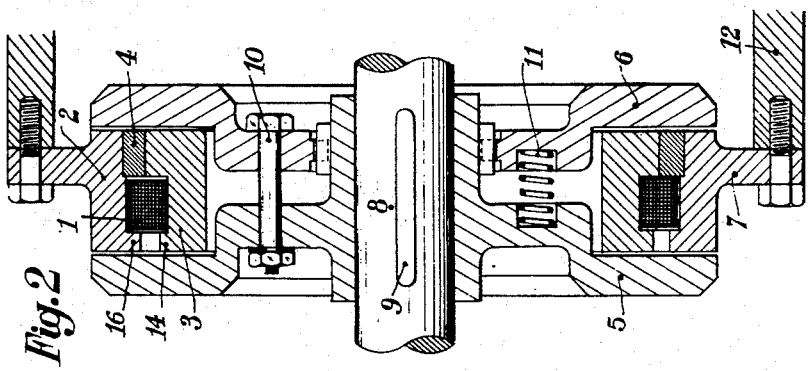
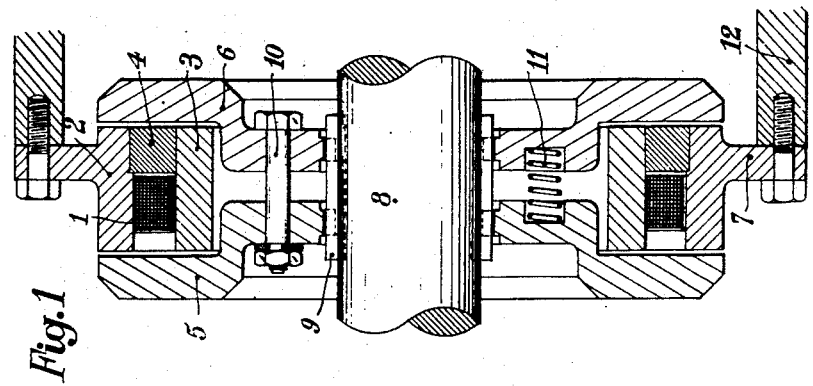
INVENTOR
JEAN, MICHEL VERNHES
BY
Munn, Liddy & Hocking
Attys.

Jan. 4, 1955
J. M. VERNHES
2,698,679
ELECTROMAGNETIC CLUTCH WITH TWO ACTIVE FACES
Filed April 24, 1951
3 Sheets-Sheet 2
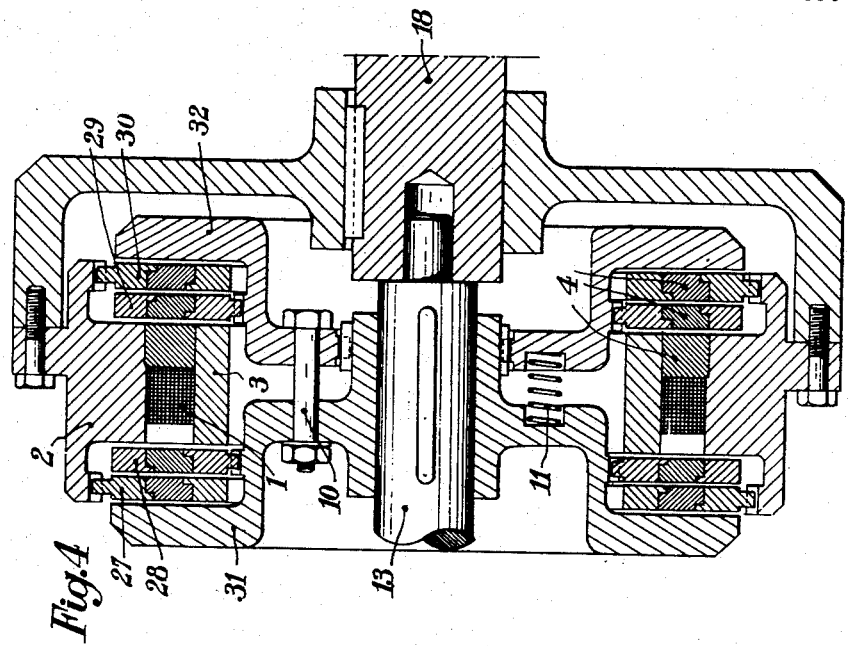
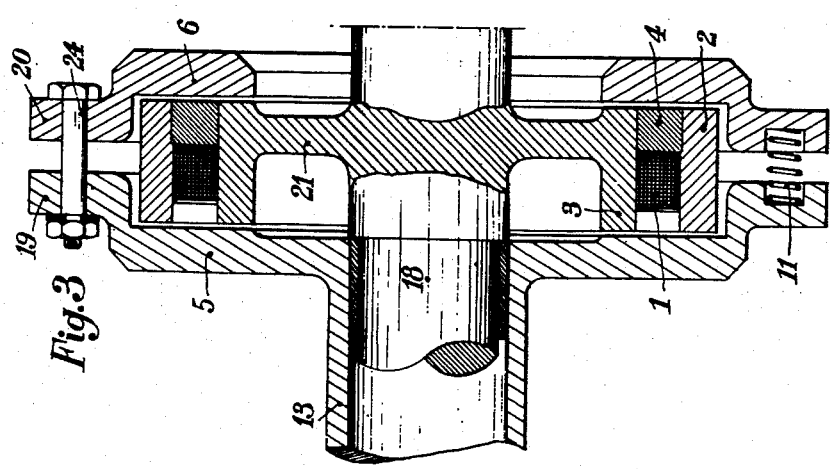
INVENTOR
JEAN, MICHEL VERNHES
BY
Munn, Liddy & Maccum
ATTYS.

Jan. 4, 1955   J. M. VERNHES   2,698,679
ELECTROMAGNETIC CLUTCH WITH TWO ACTIVE FACES
Filed April 24, 1951   3 Sheets-Sheet 3

INVENTOR
JEAN MICHEL VERNHES

United States Patent Office 2,698,679
Patented Jan. 4, 1955

2,698,679

ELECTROMAGNETIC CLUTCH WITH TWO ACTIVE FACES

Jean Michel Vernhes, Paris, France

Application April 24, 1951, Serial No. 222,625

2 Claims. (Cl. 192—84)

My invention is concerned with improvements in annular electromagnets either face of which is adapted to act upon a related armature.

The electromagnet according to my invention, which can be used for the purpose of coupling a rotatable element with either a fixed element or a further rotatable element, comprises at least one coil arranged between the inner and the outer magnetic steel pole pieces which are interconnected by a non-magnetic metal member and rigidly connected with one of the said elements, and a pair of armatures arranged at either side of the pole pieces which enclose the energizing coil and are rigid with the other element.

A few embodiments of my electromagnet will now be described more specifically, reference being had to the appended drawing in which they are illustrated in as many axial sectional views.

Figure 1 shows a fixed 2-armature inserted-coil electromagnet.

Figure 2 shows a fixed 2-armature electromagnet in which the coil is pre-wound on the inner pole-piece.

Figure 3 shows a rotatable 2-armature electromagnet.

Figure 4 shows a symmetric multi-armature electromagnet.

Figure 5:
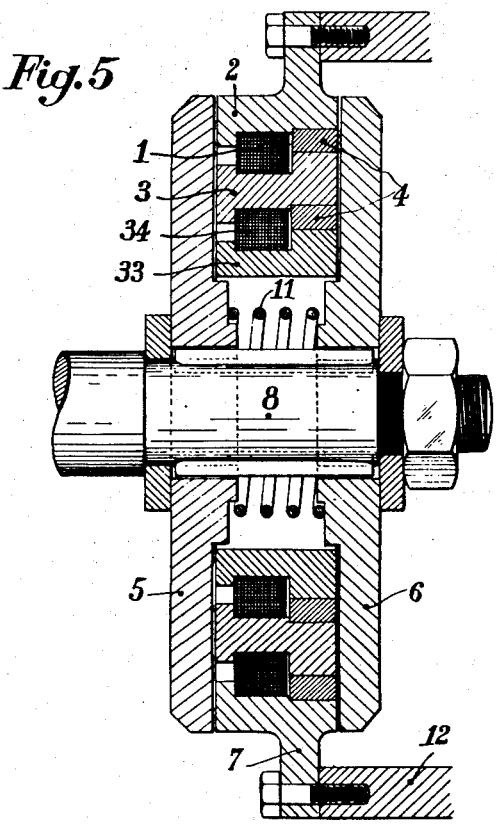
Figure 5 shows a fixed double-coil 2-armature electromagnet.

In all the embodiments illustrated, the electromagnet consists essentially of one or several concentric coils arranged each between an inner and an outer annular magnetic steel pole pieces kept in coaxial relation to one another by a seam of non-magnetic metal.

The electromagnet illustrated in Fig. 1 comprises on the one hand the electromagnet proper which includes a coil 1 through which current flows and a pair of concentric annular pole pieces 2, 3 interconnected e. g. by a ring 4 of non-magnetic metal. Said ring may be built in the fashion of a weld seam in the annular pole piece 2 and subsequently machined, after which the annular pole piece 3 is slipped in the bore of said ring 4 and secured thereto by point welding or by means of lock studs. Otherwise, for instance, the intermediate annular portion 4 can be obtained by welding or brazing a non-magnetic steel or a gunmetal rod coiled to a ring to the inside of the outer ring 2 and subsequently machining the same. The coil 1 thereafter is inserted into the channel provided between annular pole pieces 2, 3 and sealed therein e. g. by bakelization.

On the other hand, the electromagnet comprises a pair of armatures 5 and 6 intended to close the magnetic circuit. It being assumed that the electromagnet is secured at its rim 7 to any desired casing 12, the armatures 5 and 6 are rigidly connected with the element 8 by a feather key 9; in addition, they are interconnected by bolts 10 designed to limit the displacement of the same away from each other and clear of the pole pieces.

Fig. 2 illustrates a similar electromagnet in which the coil 1 is wound directly on the inner annular pole piece 3 which is provided with a shoulder 14. Likewise, the outer ring 2 is formed with a shoulder 16 and is made a driving fit on the non-magnetic portion 4 once the coil is wound in position. The remainder of the device is as shown in Fig. 1.

Fig. 3 illustrates an electromagnet which, instead of being stationary, is rigidly connected through a part 21 with a shaft 18 and performs the function of a clutch disc.

Its design is similar to that of the electromagnets described in Figs. 1 or 2.

The armatures 5 and 6 are rigid with a driving shaft 13 and interconnected at 19 and 20 by stroke-limiting dogs 24 and disengaging springs 11.

Fig. 4 illustrates an electromagnet whose magnetic circuit is closed through two pairs of armatures 27, 28 and 29, 30 arranged at either side of the electromagnet proper 1, 2, 3 in order to increase the effective driving area without increasing the diameter. Armatures 27 to 30 are annular in shape, and each armature comprises an inner and an outer ring connected by a central ring 4 of a non-magnetic material. Armatures 27 and 30 are provided with outwardly extending lugs, which slidingly cooperate with complementary spaced lugs formed on pole pieces 2. Armatures 28 and 29 are each provided with inwardly extending spaced lugs which slidingly cooperate with complementary spaced lugs formed on armatures 31 and 32. It is seen that when armatures 31 and 32 move inwardly under the influence of the flux produced by coil 1, armatures 27 and 30 will also move inwardly, since they are free to slide on the lugs formed on ring 2 and armatures 31 and 32.

These parts are composed and assembled in the same manner as multi-disc clutches; however, the armatures are designed according to the same principle as in the electromagnets described hereinbefore, that is, the magnetic flux can only flow through the outer and the inner rings, the circuit being closed by the armatures 31 and 32. It is obvious that the coil 1 of Figure 4 and the pole pieces 2 and 3 may be constructed similarly to the coil 1 and the pole pieces 2 and 3 of Figure 2.

The inner and the outer rings are assembled by means of a built up ring 4 of non-magnetic metal according to a method similar to the one described in connection with the electro-magnet proper. As already stated, the whole system may be arranged to work with its electromagnet providing either a rotatable or a fixed part.

Fig. 5 shows a modification of the arrangement according to Fig. 2 in which the electromagnet proper is composed of three concentric rings 2, 3, 33 and of a pair of coils 1, 34 wound respectively on the rings 3 and 33. It is apparent from the drawing that the armatures, such as 5 and 6, can rotate relative to the rings 2 and 3. When the coil 1 is energized the armatures engage the rings 2 and 3 and are yieldingly restrained thereby. The armatures bind themselves against the members 2 and 3 under the influence of the magnetic forces and the braking occurs due to the frictional contact.

What I claim is:

1. An electromagnetic clutch comprising a first shaft and a second shaft, said shafts being in substantial longitudinal alignment, a ring of magnetic material constituting a pole piece having its outer periphery attached to said first shaft, said ring being concentric with said second shaft, a second ring of magnetic material constituting a second pole piece concentric with said second shaft and lying within said first ring, a band of non-magnetic material connected to said first and second rings and serving to support said second ring from said first ring, and a coil mounted intermediate said rings, said rings each presenting at both ends a surface normal to said second shaft, a first armature slidably mounted on said second shaft and having a surface extending parallel to the surfaces at one end of said rings, a second armature slidably mounted on the first armature and having a surface extending parallel to the surfaces at the other end of said rings, means urging sliding movement of one of said armatures with respect to the other armature, and means for limiting such movement.

2. An electromagnetic clutch comprising a first shaft and a second shaft, said shafts being in substantial longitudinal alignment, a ring of magnetic material constituting a pole piece having its outer periphery attached to said first shaft, said ring being concentric with said second shaft, a second ring of magnetic material constituting a second pole piece concentric with said second shaft and lying within said first ring, a band of non-magnetic material connected to said first and second rings and serving to support said second ring from said first ring, a coil mounted intermediate said rings, said rings each presenting at both ends a surface normal to said second shaft, a first armature slidably mounted on said second shaft and having a surface extending parallel to the surfaces at one end of said rings, a second armature slidably mounted on the first armature and having a surface extending parallel to the surfaces at the other end of said rings, means urging sliding movement of one of said armatures with respect to the other armature, means for limiting such movement, an auxiliary armature slidingly connected to said first ring, a second auxiliary armature slidingly connected to said first armature, said auxiliary armatures being positioned intermediate the surfaces at one end of said rings and said surface on said first armature, a third auxiliary armature slidingly connected to said first ring, a fourth auxiliary armature slidingly connected to said second armature, said third and fourth auxiliary armatures being positioned intermediate the surfaces at the other end of said rings and said surface on said second armature.

References Cited in the file of this patent

UNITED STATES PATENTS

| | | |
|---|---|---|
| 882,607 | Anderson | Mar. 24, 1908 |
| 942,186 | Ravenshaw | Dec. 7, 1909 |
| 2,421,949 | Lear | June 10, 1947 |
| 2,560,868 | Hubert | July 17, 1951 |